T. G. Harold,
Dust Pan.
N° 41,771. Patented Mar. 1, 1864.
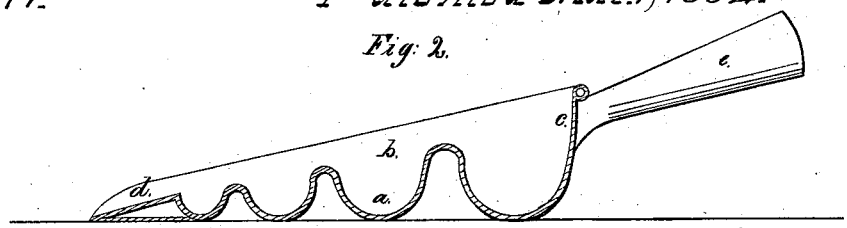
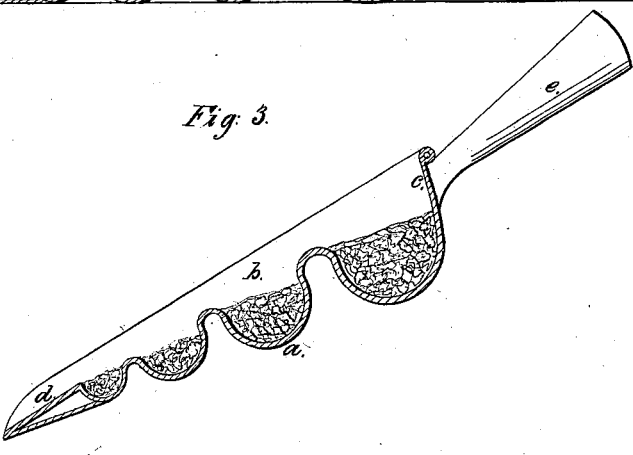
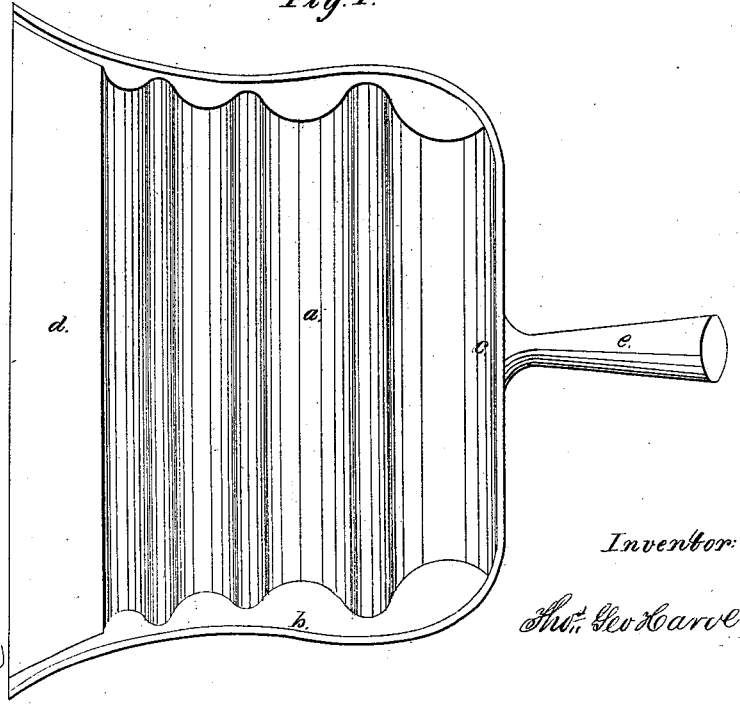
Witnesses:
Inventor:

UNITED STATES PATENT OFFICE.

THOMAS GEORGE HAROLD, OF BROOKLYN, NEW YORK.

IMPROVED DUST-PAN.

Specification forming part of Letters Patent No. 41,771, dated March 1, 1864.

*To all whom it may concern:*

Be it known that I, THOS. GEO. HAROLD, of Brooklyn, in the county of Kings and State of New York, have invented, made, and applied to use a certain new and useful Improvement in Pans for Dust or Dirt; and I do hereby declare that the following is a full, clear, and exact description of the construction and operation of the same, reference being had to the annexed drawings, making part of this specification, wherein—

Figure 1 represents a plan of my said invention. Fig. 2 is a vertical longitudinal section; and Fig. 3 is a like section showing the manner in which the dirt, dust, &c., are retained by the corrugated bottom of said pan.

In nearly all pans for dust, &c., heretofore used before my invention the bottom has been flat, and consequently had to be held at an angle to the floor or carpet in order to sweep the dust or dirt therein, and when carried care must be taken in order that the pan is not inclined, or else the dirt contained in said pan will slide out, and the lips of said pans have been liable to bend up at different places across their width, so that the dirt or dust in sweeping goes under said pan instead of into it.

The object of my invention is to obtain strength to the pan, and at the same time provide a receptacle for the dust or dirt and make a lip or sweeping-plane that will not bend up, said sweeping-lip always being at an angle to the floor, so that it is not necessary to incline the pan in order to sweep into it. To accomplish these objects I corrugate the bottom of the pan crosswise, or nearly so, of its length, and said corrugations may be increased in size as they approach the back of the pan, and I provide a triangular sweeping-lip, as shown, said lip starting from the top of the first corrugation at an inclination to the floor, and turned around parallel, or nearly so, to the under side of the pan.

In the drawings, A is the bottom or corrugated portion of said pan. $b\ b$ are the sides, and $c$ the back, said back being formed by the last corrugation. D is the double or triangular lip or inclined sweeping-edge. $e$ is the handle.

It will be seen that the corrugations strengthen the pan at the same time that they form dust or dirt receptacles, and the inclined sweeping-lip renders unnecessary any stooping over to hold the pan when using the same, the foot placed at the back being all that is required to hold the same in place.

The sides and bottom of the pan might be formed of one piece of metal struck up by dies, and when so constructed the sides would be corrugated in unison with the bottom. I am aware that a pan has been corrugated at right angles to the lip, but said pan has not an inclined or angular lip, and I am also aware that a dirt-receptacle has been made behind an inclined lip, but said lip was not strengthened by being made triangular, neither were corrugations combined with the same.

Having thus described my said invention, what I claim, and desire to secure by Letters Patent, is—

1. Corrugating the bottom of the dust-pan parallel, or nearly so, with the edge or lip, for the purposes specified.

2. Constructing the sweeping-lip of a dust-pan in a triangular form sectionally, for stiffening the same, as specified.

3. The inclined sweeping-lip of a dust-pan, in combination with the corrugated bottom, substantially as specified.

In witness whereof I have hereunto set my signature this 9th day of January, 1864.

THOS. GEO. HAROLD.

Witnesses:
JAMES H. HAROLD,
CHAS. H. SMITH.